US012499815B2

(12) United States Patent
Lee et al.

(10) Patent No.: US 12,499,815 B2
(45) Date of Patent: Dec. 16, 2025

(54) IN-PIXEL COMPENSATION FOR CURRENT DROOP AND IN-PIXEL COMPENSATION TIMING

(71) Applicant: Apple Inc., Cupertino, CA (US)

(72) Inventors: Jeongsup Lee, Santa Clara, CA (US); Hasan Akyol, Los Altos, CA (US); Xiang Lu, Campbell, CA (US); Mahdi Farrokh Baroughi, Santa Clara, CA (US); Nikhil Acharya, Mountain View, CA (US); Haitao Li, Mountain View, CA (US); Hopil Bae, Palo Alto, CA (US); John T Wetherell, San Jose, CA (US); Shengzhe Jiao, San Diego, CA (US); Stanley B Wang, Cupertino, CA (US); Sunmin Jang, Sunnyvale, CA (US); Hari P Paudel, Milpitas, CA (US); Eric A Hildebrandt, San Jose, CA (US); Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 18/210,060

(22) Filed: Jun. 14, 2023

(65) Prior Publication Data

US 2024/0005848 A1 Jan. 4, 2024

Related U.S. Application Data

(60) Provisional application No. 63/357,496, filed on Jun. 30, 2022.

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/08* (2013.01)

(58) Field of Classification Search
CPC ............. G09G 3/32; G09G 2300/0819; G09G 23/0852; G09G 2310/08
USPC ............ 345/55
See application file for complete search history.

(56) References Cited

U.S. PATENT DOCUMENTS 6,693,610 B2 2/2004 Shannon
7,166,966 B2 1/2007 Naugler
7,466,311 B2 12/2008 Kasai
7,847,764 B2 12/2010 Cok
9,953,583 B2 4/2018 Yoon
10,916,193 B2 2/2021 Yin
(Continued)

*Primary Examiner* — Mark Edwards
(74) *Attorney, Agent, or Firm* — Fletcher Yoder, P.C.

(57) ABSTRACT

An electronic device may include an electronic display including display pixels to display an image based on compensated image data. As image data is written to a pixel in the row of pixels, capacitive coupling at a driver may lead to distortion on the driver. In particular, the capacitive coupling may cause distortion at a storage capacitor, which may lead to current droop at the pixel. The current droop may be reduced or eliminated in each pixel by performing pixel compensation. The pattern of the pixel compensation may be selected such that, over a number of subframes, an average amount of light is the same or similar to what would be emitted had pixel compensation been performed on each pixel in each subframe.

20 Claims, 18 Drawing Sheets

(56) References Cited

U.S. PATENT DOCUMENTS

| | | | | |
|---|---|---|---|---|
| 2003/0156101 | A1* | 8/2003 | LeChevalier | G09G 3/3216 345/204 |
| 2007/0132674 | A1 | 6/2007 | Tsuge | |
| 2019/0066601 | A1* | 2/2019 | Yuan | G09G 3/3275 |
| 2022/0172674 | A1* | 6/2022 | Oh | G09G 3/32 |

* cited by examiner

1500

1302 1302 1302 1302 1302 1302 1304

| ROW # | SUBFRAME # 1 | 2 | 3 | 4 | 5 | 6 | 7 | 8 | 9 | 10 | 11 | 12 | 13 | 14 | 15 | 16 | AVG |
|---|---|---|---|---|---|---|---|---|---|---|---|---|---|---|---|---|---|
| 1 | 0 | 8 | 7 | 6 | 5 | 4 | 3 | 2 | 1 | 1 | 2 | 3 | 4 | 5 | 6 | 0 | 3.5625 |
| 2 | 1 | 0 | 8 | 7 | 6 | 5 | 4 | 3 | 2 | 2 | 3 | 4 | 5 | 6 | 0 | 1 | 3.5625 |
| 3 | 2 | 1 | 0 | 8 | 7 | 6 | 5 | 4 | 3 | 3 | 4 | 5 | 6 | 0 | 1 | 2 | 3.5625 |
| 4 | 3 | 2 | 1 | 0 | 8 | 7 | 6 | 5 | 4 | 4 | 5 | 6 | 0 | 1 | 2 | 3 | 3.5625 |
| 5 | 4 | 3 | 2 | 1 | 0 | 8 | 7 | 6 | 5 | 5 | 6 | 0 | 1 | 2 | 3 | 4 | 3.5625 |
| 6 | 5 | 4 | 3 | 2 | 1 | 0 | 8 | 7 | 6 | 6 | 0 | 1 | 2 | 3 | 4 | 5 | 3.5625 |
| 7 | 6 | 5 | 4 | 3 | 2 | 1 | 0 | 8 | 7 | 0 | 1 | 2 | 3 | 4 | 5 | 6 | 3.5625 |
| 8 | 7 | 6 | 5 | 4 | 3 | 2 | 1 | 0 | 0 | 1 | 2 | 3 | 4 | 5 | 6 | 7 | 3.5 |

1302 1302 1302 1302

FIG. 15

1600

1302 1602 1602 1602 1602 1602 1602 1602 1304

| SUBFRAME # | | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | | 3 | 4 | | 5 | 6 | | 7 | 8 | | 9 | 10 | | 11 | 12 | | 13 | 14 | | 15 | 16 | | AVG |
| ROW # 1 | 0 | 8 | | 8.7 | 6 | | 6.7 | 4 | | 4.7 | 2 | | 2.7 | 1 | | 3.7 | 3 | | 5.7 | 5 | | 7.7 | 0 | | 4.30625 |
| 2 | 1 | 0 | | 9.7 | 7 | | 7.7 | 5 | | 5.7 | 3 | | 3.7 | 2 | | 4.7 | 4 | | 6.7 | 6 | | 0 | 1 | | 4.2 |
| 3 | 2 | 1 | I | 0 | 8 | I | 8.7 | 6 | I | 6.7 | 4 | I | 4.7 | 3 | I | 5.7 | 5 | I | 7.7 | 0 | I | 1 | 2 | I | 4.09375 |
| 4 | 3 | 2 | F | 1 | 0 | F | 9.7 | 7 | F | 7.7 | 5 | F | 5.7 | 4 | F | 6.7 | 6 | F | 0 | 1 | F | 2 | 3 | F | 3.9875 |
| 5 | 4 | 3 | P | 2 | 1 | P | 0 | 8 | P | 8.7 | 6 | P | 6.7 | 5 | P | 7.7 | 0 | P | 1 | 2 | P | 3 | 4 | P | 3.88125 |
| 6 | 5 | 4 | | 3 | 2 | | 1 | 0 | | 9.7 | 7 | | 7.7 | 6 | | 0 | 1 | | 2 | 3 | | 4 | 5 | | 3.775 |
| 7 | 6 | 5 | | 4 | 3 | | 2 | 1 | | 0 | 8 | | | 0 | | 1 | 2 | | 3 | 4 | | 5 | 6 | | 3.66875 |
| 8 | 7 | 6 | | 5 | 4 | | 3 | 2 | | 1 | 0 | | 0 | 1 | | 2 | 3 | | 4 | 5 | | 6 | 7 | | 3.5 |

FIG. 16

1700 1702 1704

| SUBFRAME # | | 1 | 2 | 3 | 4 |
|---|---|---|---|---|---|
| ROW # | 1 | 1 | 1 | 1 | 1 |
| | 2 | 2 | 2 | 2 | 2 |
| | 3 | 3 | 5 | 5 | 3 |
| | 4 | 4 | 3 | 3 | 4 |
| | 5 | 5 | 7 | 7 | 5 |
| | 6 | 6 | 4 | 4 | 6 |
| | 7 | 7 | 6 | 6 | 7 |
| | 8 | 8 | 8 | 8 | 8 |

1710 1302 1602 1304

| SUBFRAME # | | 1 | 2 | | 3 | 4 | | 5 | 6 | | 7 | 8 | | 9 | 10 | | 11 | 12 | | 13 | 14 | | 15 | 16 | | AVG |
|---|---|---|---|---|---|---|---|---|---|---|---|---|---|---|---|---|---|---|---|---|---|---|---|---|---|---|
| ROW # | 1 | 0 | 8 | | 8.7 | 6 | | 6.7 | 4 | | 4.7 | 2 | | 2.7 | 1 | | 3.7 | 3 | | 5.7 | 5 | | 7.7 | 0 | | 4.30625 |
| | 2 | 1 | 0 | | 9.7 | 7 | | 7.7 | 5 | | 5.7 | 3 | | 3.7 | 2 | | 4.7 | 4 | | 6.7 | 6 | | 0 | 1 | | 4.2 |
| | 3 | 2 | 1 | | 2 | 8 | | 8.7 | 8 | | 8.7 | 4 | | 4.7 | 5 | | 7.7 | 5 | | 7.7 | 2 | | 3 | 2 | | 5.09375 |
| | 4 | 3 | 2 | IFP | 0 | 0 | IFP | 9.7 | 6 | IFP | 6.7 | 5 | IFP | 5.7 | 3 | IFP | 5.7 | 6 | IFP | 0 | 0 | IFP | 1 | 3 | IFP | 3.4875 |
| | 5 | 4 | 3 | | 4 | 1 | | 0 | 1 | | 0 | 6 | | 6.7 | 0 | | 1 | 0 | | 1 | 4 | | 5 | 4 | | 2.66875 |
| | 6 | 5 | 4 | | 1 | 2 | | 1 | 7 | | 7.7 | 7 | | 7.7 | 4 | | 6.7 | 1 | | 2 | 1 | | 2 | 5 | | 3.88125 |
| | 7 | 6 | 5 | | 3 | 3 | | 2 | 0 | | 9.7 | 8 | | 8.7 | 6 | | 0 | 2 | | 3 | 3 | | 4 | 6 | | 4.275 |
| | 8 | 7 | 6 | | 5 | 4 | | 3 | 2 | | 1 | 0 | | 0 | 1 | | 2 | 3 | | 4 | 5 | | 6 | 7 | | 3.5 |

FIG. 17

1802

| | FRAME #1 | | | | | | | | | | | | | | | | | | | | | | | | FRAME #2 | | | | | AVG |
|---|---|---|---|---|---|---|---|---|---|---|---|---|---|---|---|---|---|---|---|---|---|---|---|---|---|---|---|---|---|---|
| SUBFRAME # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | 1 | 2 | IFP | 16 | IFP | TOTAL |
| ROW # 1 | 0 | 1 | | 3.7 | 3 | | 5.7 | 5 | | 7.7 | 0 | | 2.7 | 2 | | 4.7 | 4 | | 6.7 | 6 | | 0 | 1 | | | | | | | 3.325 |
| 2 | 1 | 2 | | 4.7 | 4 | | 6.7 | 6 | | 0 | 1 | | 3.7 | 3 | | 5.7 | 5 | | 7.7 | 0 | | 1 | 2 | | | | | | | 3.344 |
| 3 | 2 | 3 | | 5.7 | 5 | | 7.7 | 0 | | 1 | 2 | | 4.7 | 4 | | 6.7 | 6 | | 0 | 1 | | 2 | 3 | | | | | | | 3.363 |
| 4 | 3 | 4 | | 6.7 | 6 | | 0 | 1 | | 2 | 3 | | 5.7 | 5 | | 7.7 | 0 | | 1 | 2 | | 3 | 4 | | | | | | | 3.381 |
| 5 | 4 | 5 | | 7.7 | 0 | | 1 | 2 | | 3 | 4 | | 6.7 | 6 | | 0 | 1 | | 2 | 3 | | 4 | 5 | | | | | | | 3.400 |
| 6 | 5 | 6 | | 0 | 1 | | 2 | 3 | | 4 | 5 | | 7.7 | 0 | | 1 | 2 | | 3 | 4 | | 5 | 6 | | | | | | | 3.419 |
| 7 | 6 | 0 | | 1 | 2 | | 3 | 4 | | 5 | 6 | | 0 | 1 | | 2 | 3 | | 4 | 5 | | 6 | 0 | | | | | | | 3.000 |
| 8 | 0 | 1 | | 2 | 3 | | 4 | 5 | | 6 | 0 | | 1 | 2 | | 3 | 4 | | 5 | 6 | | 0 | 1 | | | | | | | 2.688 |

1804

| | FRAME #1 | | | | | | | | | | | | | | | | | | | | | | | | FRAME #2 | | | | | AVG |
|---|---|---|---|---|---|---|---|---|---|---|---|---|---|---|---|---|---|---|---|---|---|---|---|---|---|---|---|---|---|---|
| SUBFRAME # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | 1 | 2 | IFP | 16 | IFP | TOTAL |
| ROW # 1 | 0 | 3 | | 2.7 | 4 | | 3.7 | 0 | | 4.7 | 1 | | 5.7 | 2 | | 0 | 3 | | 2.7 | 4 | | 3.7 | 0 | | | | | | | 2.513 |
| 2 | 1 | 4 | | 3.7 | 0 | | 4.7 | 1 | | 5.7 | 2 | | 0 | 3 | | 1 | 4 | | 3.7 | 0 | | 4.7 | 1 | | | | | | | 2.469 |
| 3 | 2 | 0 | | 4.7 | 1 | | 5.7 | 2 | | 0 | 3 | | 1 | 4 | | 2 | 0 | | 4.7 | 1 | | 5.7 | 2 | | | | | | | 2.425 |
| 4 | 3 | 1 | | 5.7 | 2 | | 0 | 3 | | 1 | 4 | | 2 | 0 | | 3 | 1 | | 5.7 | 2 | | 0 | 3 | | | | | | | 2.275 |
| 5 | 4 | 2 | | 0 | 3 | | 1 | 4 | | 2 | 0 | | 3 | 1 | | 4 | 2 | | 0 | 3 | | 1 | 4 | | | | | | | 2.125 |
| 6 | 0 | 3 | | 1 | 4 | | 2 | 0 | | 3 | 1 | | 4 | 2 | | 0 | 3 | | 1 | 4 | | 2 | 0 | | | | | | | 1.875 |
| 7 | 1 | 4 | | 2 | 0 | | 3 | 1 | | 4 | 2 | | 0 | 3 | | 1 | 4 | | 2 | 0 | | 3 | 1 | | | | | | | 1.838 |
| 8 | 2 | 0 | | 3 | 1 | | 4 | 2 | | 5 | 3 | | 1 | 4 | | 2 | 0 | | 3 | 1 | | 4 | 2 | | | | | | | 2.000 |

1806

| | SUBFRAME # | | | | | | | | | | | | | | | | | | | | | | | | AVG |
|---|---|---|---|---|---|---|---|---|---|---|---|---|---|---|---|---|---|---|---|---|---|---|---|---|---|
| SUBFRAME # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | | TOTAL |
| ROW # 1 | 0 | 2 | | 2.7 | 0 | | 3.7 | 1 | | 0 | 2 | | 2.7 | 0 | | 3.7 | 1 | | 0 | 2 | | 2.7 | 0 | | 1.469 |
| 2 | 1 | 0 | | 3.7 | 1 | | 0 | 2 | | 1 | 0 | | 3.7 | 1 | | 0 | 2 | | 1 | 0 | | 3.7 | 1 | | 1.319 |
| 3 | 2 | 1 | | 0 | 2 | | 1 | 0 | | 2 | 1 | | 0 | 2 | | 1 | 0 | | 2 | 1 | | 0 | 2 | | 1.063 |
| 4 | 0 | 2 | | 1 | 0 | | 2 | 1 | | 0 | 2 | | 1 | 0 | | 2 | 1 | | 0 | 2 | | 1 | 0 | | 0.938 |
| 5 | 1 | 0 | | 2 | 1 | | 0 | 2 | | 1 | 0 | | 2 | 1 | | 0 | 2 | | 1 | 0 | | 2 | 1 | | 1.000 |
| 6 | 2 | 1 | | 0 | 2 | | 1 | 0 | | 2 | 1 | | 0 | 2 | | 1 | 0 | | 2 | 1 | | 0 | 2 | | 1.003 |
| 7 | 0 | 2 | | 1 | 0 | | 2 | 1 | | 0 | 2 | | 1 | 0 | | 2 | 1 | | 0 | 2 | | 1 | 0 | | 0.938 |
| 8 | 1 | 0 | | 2 | 1 | | 0 | 2 | | 1 | 0 | | 2 | 1 | | 0 | 2 | | 1 | 0 | | 2 | 1 | | 1.000 |

1808

| EMISSION PATTERN | | | | |
|---|---|---|---|---|
| | SUBFRAME # | | | |
| | 1 | 2 | 3 | 4 |
| ROW # 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 5 | 5 |
| 6 | 6 | 6 | 6 | 6 |
| 7 | 7 | 7 | 7 | 7 |
| 8 | 8 | 8 | 8 | 8 |

FIG. 18

1902

| SUBFRAME # / ROW # | FRAME #1: 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | FRAME #2: 1 | 2 | IFP | 16 | IFP | AVG TOTAL |
|---|---|---|---|---|---|---|---|---|---|---|---|---|---|---|---|---|---|---|---|---|---|---|---|---|---|---|---|---|---|---|
| 1 | 2 | 4 | | 3.7 | 5 | | 7.7 | 1 | | 7.7 | 2 | | 4.7 | 5 | | 4.7 | 5 | | 0 | 2 | | 0 | 3 | | | | | | | 3.556 |
| 2 | 6 | 1 | | 7.7 | 2 | | 3 | 5 | | 3 | 6 | | 0 | 2 | | 0 | 3 | | 4 | 6 | | 4 | 0 | | | | | | | 3.294 |
| 3 | 0 | 2 | | 5.7 | 6 | | 5.7 | 6 | | 1 | 3 | | 2.7 | 3 | | 6.7 | 0 | | 6.7 | 0 | | 2 | 4 | | | | | | | 3.406 |
| 4 | 4 | 6 | | 1 | 3 | | 1 | 3 | | 6 | 0 | | 6.7 | 0 | | 2 | 4 | | 2 | 4 | | 6 | 1 | | | | | | | 3.044 |
| 5 | 3 | 3 | | 4.7 | 3 | | 0 | 0 | | 0 | 0 | | 5.7 | 4 | | 5.7 | 4 | | 1 | 1 | | 1 | 1 | | | | | | | 2.319 |
| 6 | 0 | 0 | | 0 | 0 | | 4 | 4 | | 4 | 4 | | 1 | 1 | | 1 | 1 | | 5 | 5 | | 5 | 5 | | | | | | | 2.500 |
| 7 | 1 | 1 | | 6.7 | 4 | | 6.7 | 5 | | 2 | 1 | | 3.7 | 2 | | 7.7 | 5 | | 7.7 | 6 | | 3 | 2 | | | | | | | 4.031 |
| 8 | 5 | 5 | | 2 | 1 | | 2 | 2 | | 6 | 5 | | 7.7 | 6 | | 3 | 2 | | 3 | 3 | | 0 | 6 | | | | | | | 3.669 |

1904

| SUBFRAME # / ROW # | FRAME #1: 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | FRAME #2: 1 | 2 | IFP | 16 | IFP | AVG TOTAL |
|---|---|---|---|---|---|---|---|---|---|---|---|---|---|---|---|---|---|---|---|---|---|---|---|---|---|---|---|---|---|---|
| 1 | 2 | 1 | | 2.7 | 1 | | 5.7 | 3 | | 4.7 | 3 | | 1 | 0 | | 0 | 0 | | 4.7 | 2 | | 3.7 | 2 | | | | | | | 2.281 |
| 2 | 1 | 0 | | 0 | 0 | | 3 | 2 | | 2 | 2 | | 0 | 4 | | 4 | 4 | | 2 | 1 | | 1 | 1 | | | | | | | 1.688 |
| 3 | 0 | 4 | | 4.7 | 2 | | 3.7 | 1 | | 0 | 4 | | 5.7 | 3 | | 2 | 1 | | 2.7 | 0 | | 5.7 | 3 | | | | | | | 2.656 |
| 4 | 4 | 3 | | 2 | 1 | | 1 | 0 | | 4 | 3 | | 3 | 2 | | 1 | 0 | | 0 | 4 | | 3 | 2 | | | | | | | 2.063 |
| 5 | 3 | 0 | | 3.7 | 4 | | 0 | 2 | | 5.7 | 1 | | 2 | 4 | | 1 | 3 | | 5.7 | 1 | | 4.7 | 0 | | | | | | | 2.550 |
| 6 | 2 | 4 | | 1 | 3 | | 4 | 1 | | 3 | 0 | | 1 | 3 | | 0 | 2 | | 3 | 0 | | 2 | 4 | | | | | | | 2.063 |
| 7 | 1 | 3 | | 5.7 | 0 | | 4.7 | 0 | | 1 | 2 | | 0 | 2 | | 3 | 4 | | 3.7 | 1 | | 0 | 1 | | | | | | | 2.194 |
| 8 | 0 | 2 | | 3 | 4 | | 2 | 4 | | 0 | 1 | | 4 | 1 | | 2 | 3 | | 1 | 3 | | 4 | 0 | | | | | | | 2.125 |

1906

| SUBFRAME # / ROW # | SUBFRAME #: 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | AVG TOTAL |
|---|---|---|---|---|---|---|---|---|---|---|---|---|---|---|---|---|---|---|---|---|---|---|---|---|
| 1 | 2 | 2 | | 2.7 | 2 | | 1 | 1 | | 0 | 1 | | 0 | 0 | | 3.7 | 0 | | 2 | 2 | | 2.7 | 2 | 1.506 |
| 2 | 0 | 0 | | 2 | 0 | | 2 | 2 | | 1 | 2 | | 1 | 1 | | 0 | 1 | | 0 | 0 | | 2 | 0 | 0.875 |
| 3 | 0 | 0 | | 0 | 0 | | 3.7 | 2 | | 2 | 2 | | 2.7 | 1 | | 1 | 1 | | 0 | 0 | | 0 | 0 | 0.963 |
| 4 | 1 | 1 | | 1 | 1 | | 0 | 0 | | 0 | 0 | | 2 | 2 | | 2 | 2 | | 1 | 1 | | 1 | 1 | 1.000 |
| 5 | 0 | 1 | | 3.7 | 0 | | 2 | 0 | | 1 | 2 | | 1 | 2 | | 0 | 1 | | 0 | 1 | | 3.7 | 0 | 1.150 |
| 6 | 1 | 2 | | 0 | 1 | | 0 | 1 | | 2 | 0 | | 2 | 0 | | 1 | 2 | | 1 | 2 | | 0 | 1 | 1.000 |
| 7 | 1 | 2 | | 1 | 1 | | 0 | 1 | | 0 | 0 | | 3.7 | 0 | | 2 | 2 | | 1 | 2 | | 1 | 1 | 1.169 |
| 8 | 2 | 0 | | 2 | 2 | | 1 | 2 | | 1 | 1 | | 0 | 1 | | 0 | 0 | | 2 | 0 | | 2 | 2 | 1.125 |

1908

EMISSION PATTERN

| ROW # | SUBFRAME #: 1 | 2 | 3 | 4 |
|---|---|---|---|---|
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 5 | 5 |
| 6 | 6 | 6 | 6 | 6 |
| 7 | 7 | 7 | 7 | 7 |
| 8 | 8 | 8 | 8 | 8 |

FIG. 19

2002

| | FRAME #1 | | | | | | | | | | | | | | | | | | | | | | | | FRAME #2 | | | | | AVG |
|---|---|---|---|---|---|---|---|---|---|---|---|---|---|---|---|---|---|---|---|---|---|---|---|---|---|---|---|---|---|---|
| SUBFRAME # / ROW # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | 1 | 2 | IFP | 16 | IFP | TOTAL |
| 1 | 0 | 3 | | 4.7 | 2 | | 4 | 0 | | 0 | 6 | | 1 | 4 | | 5.7 | 3 | | 5 | 1 | | 1 | 0 | | | | | | | 2.525 |
| 2 | 6 | 4 | | 6.7 | 3 | | 3 | 1 | | 2 | 0 | | 0 | 5 | | 7.7 | 4 | | 4 | 2 | | 3 | 1 | | | | | | | 3.275 |
| 3 | 5 | 2 | | 3.7 | 6 | | 2 | 6 | | 7.7 | 3 | | 7.7 | 3 | | 4.7 | 0 | | 3 | 0 | | 0 | 4 | | | | | | | 3.613 |
| 4 | 1 | 5 | | 5.7 | 0 | | 6.7 | 2 | | 1 | 4 | | 3.7 | 6 | | 6.7 | 1 | | 7.7 | 3 | | 2 | 5 | | | | | | | 3.781 |
| 5 | 3 | 1 | | 7.7 | 1 | | 0 | 5 | | 3 | 5 | | 5.7 | 2 | | 0 | 2 | | 1 | 6 | | 4 | 6 | | | | | | | 3.275 |
| 6 | 2 | 1 | | 0 | 5 | | 7.7 | 5 | | 4 | 2 | | 4.7 | 2 | | 1 | 6 | | 0 | 6 | | 5 | 3 | | | | | | | 3.400 |
| 7 | 4 | 0 | | 1 | 3 | | 1 | 4 | | 5 | 0 | | 6.7 | 1 | | 2 | 4 | | 2 | 5 | | 6 | 1 | | | | | | | 2.856 |
| 8 | 0 | 6 | | 2 | 4 | | 5.7 | 3 | | 6 | 1 | | 2.7 | 0 | | 3 | 5 | | 6.7 | 4 | | 0 | 2 | | | | | | | 3.194 |

2004

| | FRAME #1 | | | | | | | | | | | | | | | | | | | | | | | | FRAME #2 | | | | | AVG |
|---|---|---|---|---|---|---|---|---|---|---|---|---|---|---|---|---|---|---|---|---|---|---|---|---|---|---|---|---|---|---|
| SUBFRAME # / ROW # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | IFP | 1 | 2 | IFP | 16 | IFP | TOTAL |
| 1 | 2 | 0 | | 3.7 | 0 | | 4 | 2 | | 5.7 | 2 | | 1 | 4 | | 1 | 4 | | 3 | 1 | | 3.7 | 1 | | | | | | | 2.444 |
| 2 | 1 | 1 | | 5.7 | 1 | | 3 | 3 | | 1 | 3 | | 0 | 0 | | 3 | 0 | | 2 | 2 | | 0 | 2 | | | | | | | 1.731 |
| 3 | 0 | 4 | | 2.7 | 2 | | 2 | 1 | | 4.7 | 4 | | 4 | 3 | | 0 | 1 | | 1 | 0 | | 5.7 | 3 | | | | | | | 2.256 |
| 4 | 1 | 2 | | 4.7 | 3 | | 4.7 | 4 | | 0 | 0 | | 0 | 1 | | 2 | 2 | | 3.7 | 3 | | 2.7 | 4 | | | | | | | 2.550 |
| 5 | 3 | 3 | | 0 | 4 | | 0 | 0 | | 2 | 1 | | 2 | 2 | | 4 | 3 | | 5.7 | 4 | | 1 | 0 | | | | | | | 2.169 |
| 6 | 2 | 0 | | 1 | 1 | | 6.7 | 2 | | 3 | 3 | | 1 | 4 | | 0 | 0 | | 4.7 | 1 | | 2 | 2 | | | | | | | 2.025 |
| 7 | 4 | 1 | | 2 | 4 | | 1 | 1 | | 4 | 1 | | 3 | 3 | | 1 | 3 | | 0 | 0 | | 3 | 0 | | | | | | | 2.125 |
| 8 | 0 | 3 | | 3 | 0 | | 5.7 | 0 | | 0 | 2 | | 5.7 | 2 | | 2 | 4 | | 5.7 | 4 | | 4 | 1 | | | | | | | 2.319 |

2006

| | FRAME #1 | | | | | | | | | | | | | | | | | | | | | | | | AVG |
|---|---|---|---|---|---|---|---|---|---|---|---|---|---|---|---|---|---|---|---|---|---|---|---|---|---|
| SUBFRAME # / ROW # | 1 | 2 | IFP | 3 | 4 | IFP | 5 | 6 | IFP | 7 | 8 | IFP | 9 | 10 | IFP | 11 | 12 | IFP | 13 | 14 | IFP | 15 | 16 | | TOTAL |
| 1 | 1 | 1 | | 3.7 | 0 | | 0 | 0 | | 1 | 2 | | 2 | 2 | | 0 | 1 | | 1 | 1 | | 3.7 | 0 | | 1.213 |
| 2 | 0 | 2 | | 1 | 1 | | 2 | 1 | | 0 | 0 | | 1 | 0 | | 2 | 2 | | 0 | 2 | | 1 | 1 | | 1.000 |
| 3 | 2 | 0 | | 2.7 | 0 | | 1 | 2 | | 0 | 2 | | 0 | 1 | | 3.7 | 1 | | 2 | 0 | | 2.7 | 0 | | 1.256 |
| 4 | 1 | 0 | | 0 | 1 | | 0 | 2 | | 2 | 0 | | 3.7 | 1 | | 1 | 2 | | 1 | 2 | | 0 | 1 | | 0.981 |
| 5 | 0 | 2 | | 2 | 2 | | 2 | 1 | | 1 | 1 | | 1 | 0 | | 0 | 0 | | 0 | 2 | | 2 | 2 | | 1.125 |
| 6 | 2 | 0 | | 0 | 2 | | 1 | 2 | | 2 | 1 | | 0 | 1 | | 1 | 0 | | 2 | 0 | | 0 | 2 | | 1.000 |
| 7 | 1 | 2 | | 1 | 0 | | 0 | 1 | | 0 | 2 | | 2 | 0 | | 2 | 1 | | 1 | 2 | | 1 | 0 | | 1.000 |
| 8 | 0 | 1 | | 2 | 1 | | 3.7 | 0 | | 1 | 0 | | 2.7 | 2 | | 0 | 2 | | 0 | 1 | | 2 | 1 | | 1.213 |

2008

| EMISSION PATTERN | | | | |
|---|---|---|---|---|
| SUBFRAME # | | | | |
| ROW # | 1 | 2 | 3 | 4 |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 5 | 5 |
| 6 | 6 | 6 | 6 | 6 |
| 7 | 7 | 7 | 7 | 7 |
| 8 | 8 | 8 | 8 | 8 |

FIG. 20

IN-PIXEL COMPENSATION FOR CURRENT DROOP AND IN-PIXEL COMPENSATION TIMING

CROSS-REFERENCE TO RELATED APPLICATIONS

This application claims priority to U.S. Provisional Application No. 63/357,496 filed Jun. 30, 2022, entitled "In-Pixel Compensation for Current Droop and In-Pixel Compensation Timing," the disclosure of which is incorporated by reference in its entirety for all purposes.

SUMMARY

This disclosure relates to compensating for pixel distortion to prevent undesirable image artifacts on an electronic display of an electronic device.

Numerous electronic devices—including televisions, portable phones, computers, wearable devices, vehicle dashboards, virtual-reality glasses, and more—display images on an electronic display. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

In certain electronic displays (e.g., a μLEDs display), a microdriver may drive a row of pixels in succession over a period of time. As subsequent pixels in the row are driven, inherent electrical resistance in the pixels and conductors coupling the pixels may cause a current droop or a current rise in the subsequent pixels in the row. Consequently, each subsequent pixel may emit less light than the prior pixel. The current droop may produce various visible image artifacts (e.g., banding) on the electronic display. The artifacts may be exacerbated by a touch sensor subsystem.

Additionally, as image data is written to a pixel (e.g., via the microdriver) in the row of pixels, capacitive coupling at the microdriver may lead to distortion on the microdriver. In particular, the capacitive coupling may cause distortion at a storage capacitor, which may lead to current droop or current rise at the pixel. Moreover, the distortion may increase at each subsequent pixel in the row of pixels, which may lead to greater distortion, and consequently greater current droop or current rise on the pixels, with pixels in the last row of the pixels experiencing the greatest current droop or the greatest current rise. As a result of the increasing current droop or the increasing current rise, the pixels further along the row may emit less light than the prior pixel. The current droop or rise may produce various visible image artifacts (e.g., banding) on the electronic display.

In an embodiment, the current droop or rise may be reduced or eliminated in each pixel by performing pixel compensation. Pixel compensation (e.g., which may, in some cases, be referred to as in-pixel compensation (IPC)), may include refreshing a storage capacitor by updating the storage voltage on the storage capacitor. In this way, pixel compensation may reduce or eliminate the distortion experienced at the microdriver for a period of time caused by the current droop or the current rise. While using pixel compensation may reduce or eliminate current droop or current rise each time it is performed, performing pixel compensation on each pixel in the electronic display may result in excessive power consumption.

In another embodiment, pixel compensation may be performed on different pixels in a row of pixels for different subframes to prevent adjacent pixels of the row from consistently emitting less light than the prior pixel of the row. The pattern of the pixel compensation may be selected such that, over a number of subframes, an average amount of light is the same or similar to what would be emitted had pixel compensation been performed on each pixel in each subframe. For example, pixel compensation may be performed on every third pixel of the row in a first subframe, and then the pixels on which pixel compensation may be performed may be shifted by a number of pixels in the row. In another example the pixel compensation may be performed on every seventh pixel of a row of eight pixels, such that the first pixel of the row and the eighth pixel are corrected via pixel compensation in a first subframe, the seventh pixel is corrected in a second subframe, the sixth pixel is corrected in a third subframe, and so on. The aforementioned shuffling pattern and/or other shuffling patterns may further reduce an appearance of image artifacts by taking into account an intra-frame pause during a touch sensor operation. While performing pixel compensation may be discussed as reducing or eliminating current droop, it should be noted that the same principles may apply to reducing or eliminating current rise.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 15 is a table that tracks another pixel compensation pattern and stores average luminance differences for each row of pixels in each subframe of a frame, in accordance with an embodiment;

FIG. 16 is a table using the pixel compensation pattern illustrated in FIG. 15, taking into account additional current droop due to intra-frame pause (IFP), in accordance with an embodiment;

FIG. 17 includes an example of a shuffled emission pattern that may be applied across a frame, and a table illustrating an application of the shuffled emission pattern and a shuffled pixel compensation pattern, in accordance with an embodiment;

FIG. 18 illustrates multiple pixel compensation patterns that may be effective in reducing or eliminating luminance differences caused by current droop in an electronic display utilizing a sequential emission pattern, in accordance with an embodiment;

FIG. 19 illustrates how the pixel compensation patterns described in FIG. 18 may be effective in reducing or eliminating luminance differences caused by current droop in an electronic display utilizing a shuffled emission pattern, in accordance with an embodiment; and FIG. 20 illustrates how the pixel compensation patterns described in FIG. 18 may be effective in reducing or eliminating luminance differences caused by current droop in an electronic display utilizing another shuffled emission pattern, in accordance with an embodiment.

DETAILED DESCRIPTION

Figure 1:
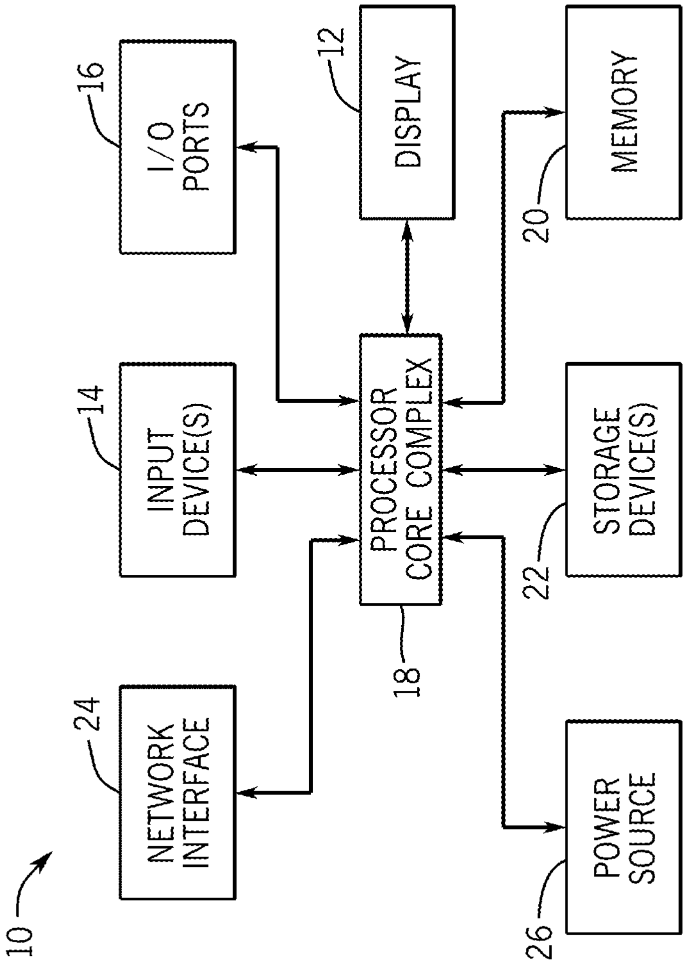
FIG. 1 is a block diagram of an electronic device with an electronic display, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As image data is written to a pixel (e.g., via a microdriver) in a row of pixels, capacitive coupling at the microdriver may lead to distortion on the microdriver. In particular, the capacitive coupling may cause distortion at a storage capacitor, which may lead to current droop at the pixel. Moreover, the distortion may increase over time such that distortion grows at each subsequent pixel in the row of pixels, which may lead to greater distortion, and consequently greater current droop on the pixels, with pixels in the last row of the pixels experiencing the greatest current droop. As a result of the increasing current droop, the pixels further along the row may emit less light than the prior pixel. Consistent current droop across rows may produce various visible image artifacts (e.g., banding) on the electronic display.

In an embodiment, the current droop may be reduced or eliminated in each pixel by performing pixel compensation. Pixel compensation, as defined herein, may be performed at the microdriver include refreshing a storage capacitor by updating the storage voltage on the storage capacitor. In this way, pixel compensation may reduce or eliminate the distortion experienced at the microdriver for a period of time. While using pixel compensation may reduce or eliminate current droop, performing pixel compensation on each pixel in the electronic display may result in excessive power consumption.

In another embodiment, pixel compensation may be performed on different pixels in a row of pixels for different subframes to prevent adjacent pixels of the row from consistently emitting less light than the prior pixel of the row. The pattern of the pixel compensation may be selected such that, over a number of subframes, an average amount of light is the same or similar to what would be emitted had pixel compensation been performed on each pixel in each subframe. For example, pixel compensation may be performed on every third pixel of the row in a first subframe, and then the pixels on which pixel compensation may be performed may be shifted by a number of pixels in the row. In another example the pixel compensation may be performed on every seventh pixel of a row of eight pixels, such that the first pixel of the row and the eighth pixel are corrected via pixel compensation in a first subframe, the seventh pixel is corrected in a second subframe, the sixth pixel is corrected in a third subframe, and so on. The aforementioned shuffling pattern and/or other shuffling patterns may further reduce an appearance of image artifacts by taking into account an intra-frame pause during a touch sensor operation.

With the preceding in mind, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in the electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field-programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
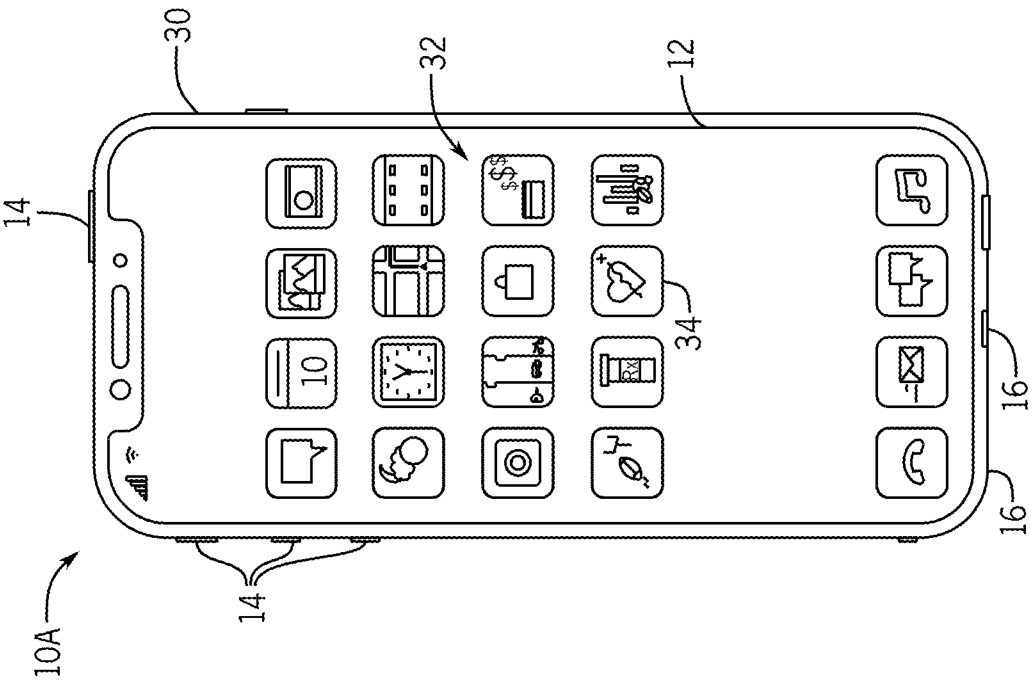
FIG. 2 is a front view of a handheld device representing another embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
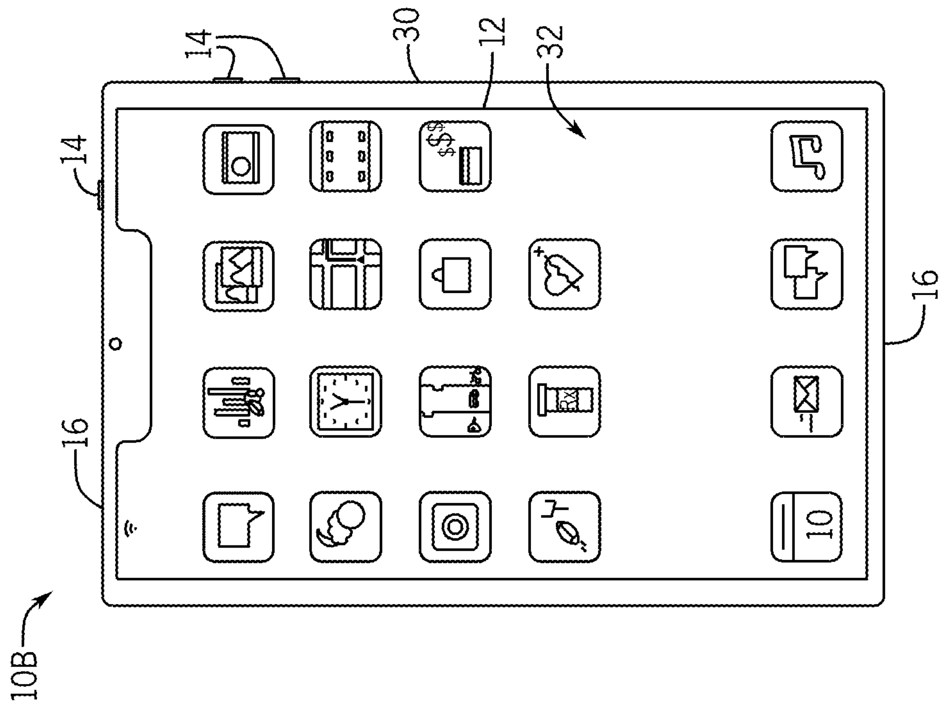
FIG. 3 is a front view of another handheld device representing another embodiment of the electronic device of FIG. 1.
Figure 4:
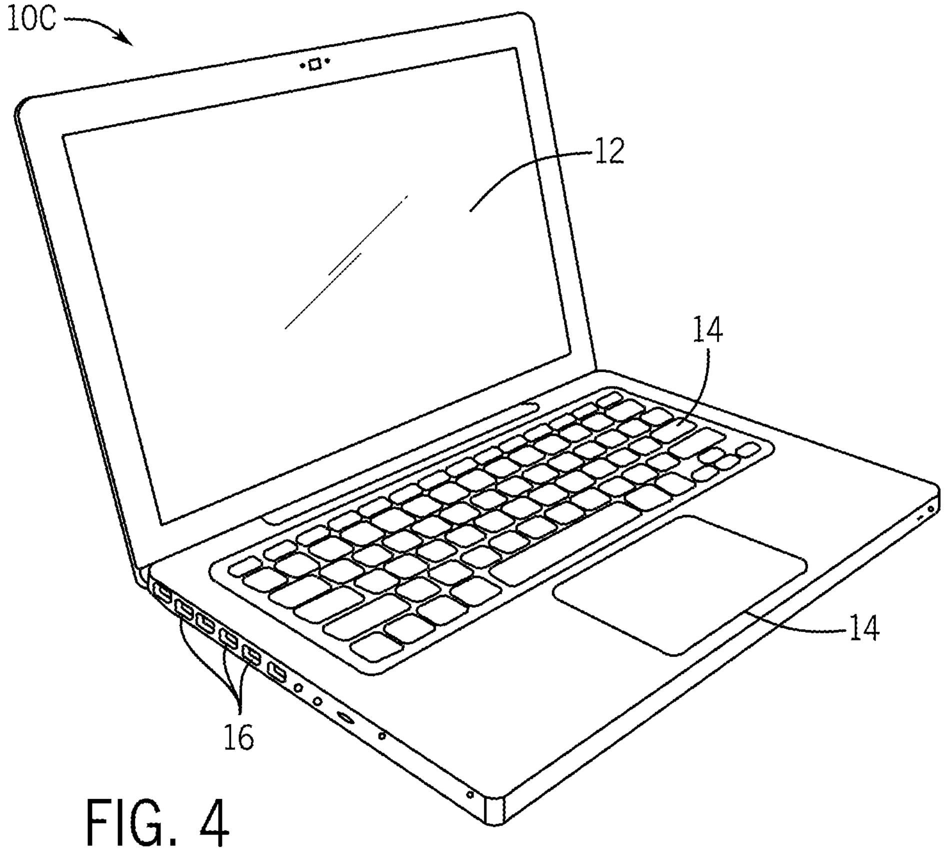
FIG. 4 is a perspective view of a notebook computer representing an embodiment of the electronic device of FIG. 1.
Figure 5:
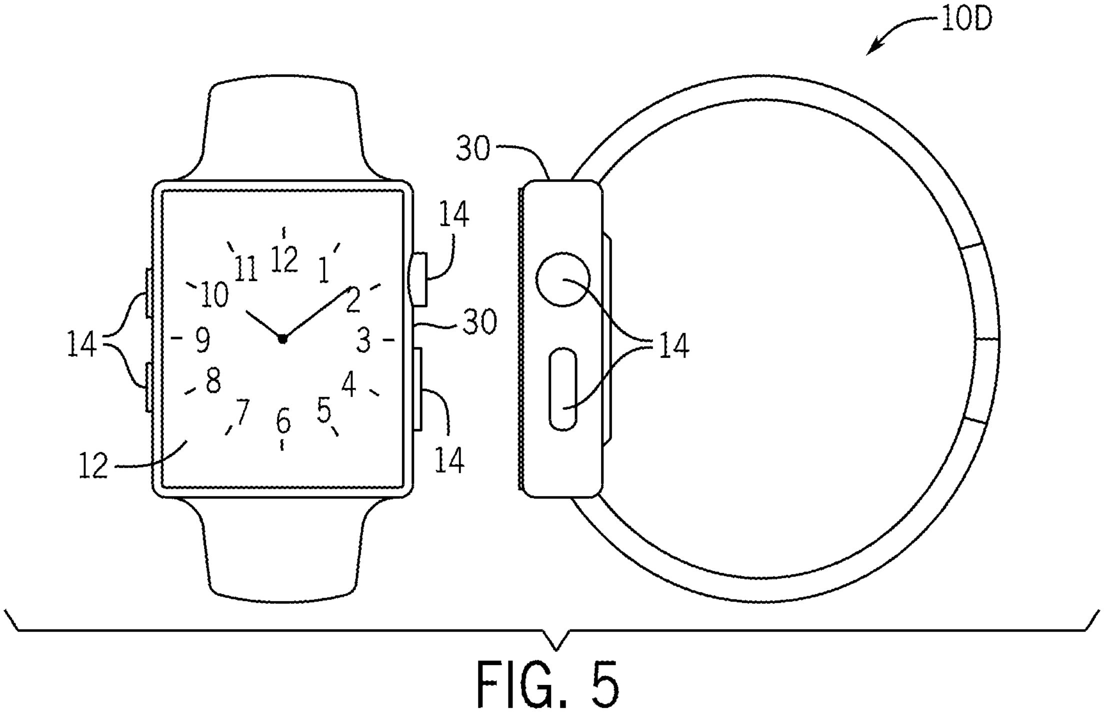
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
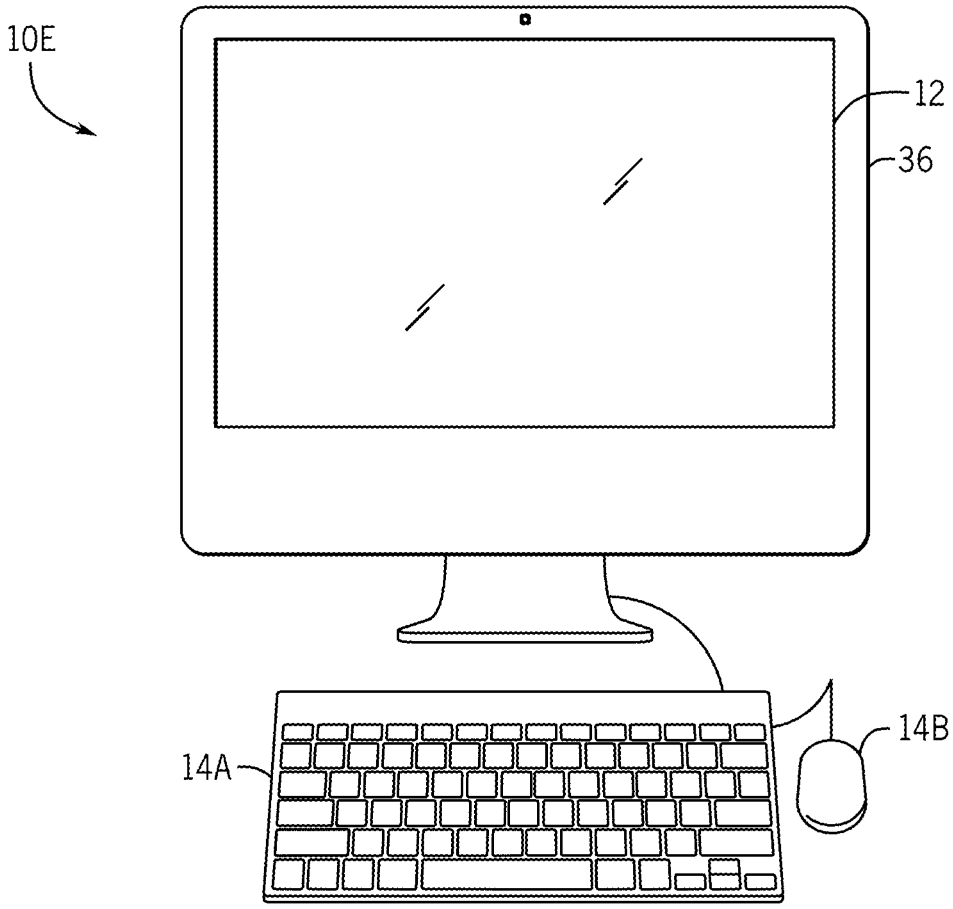
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
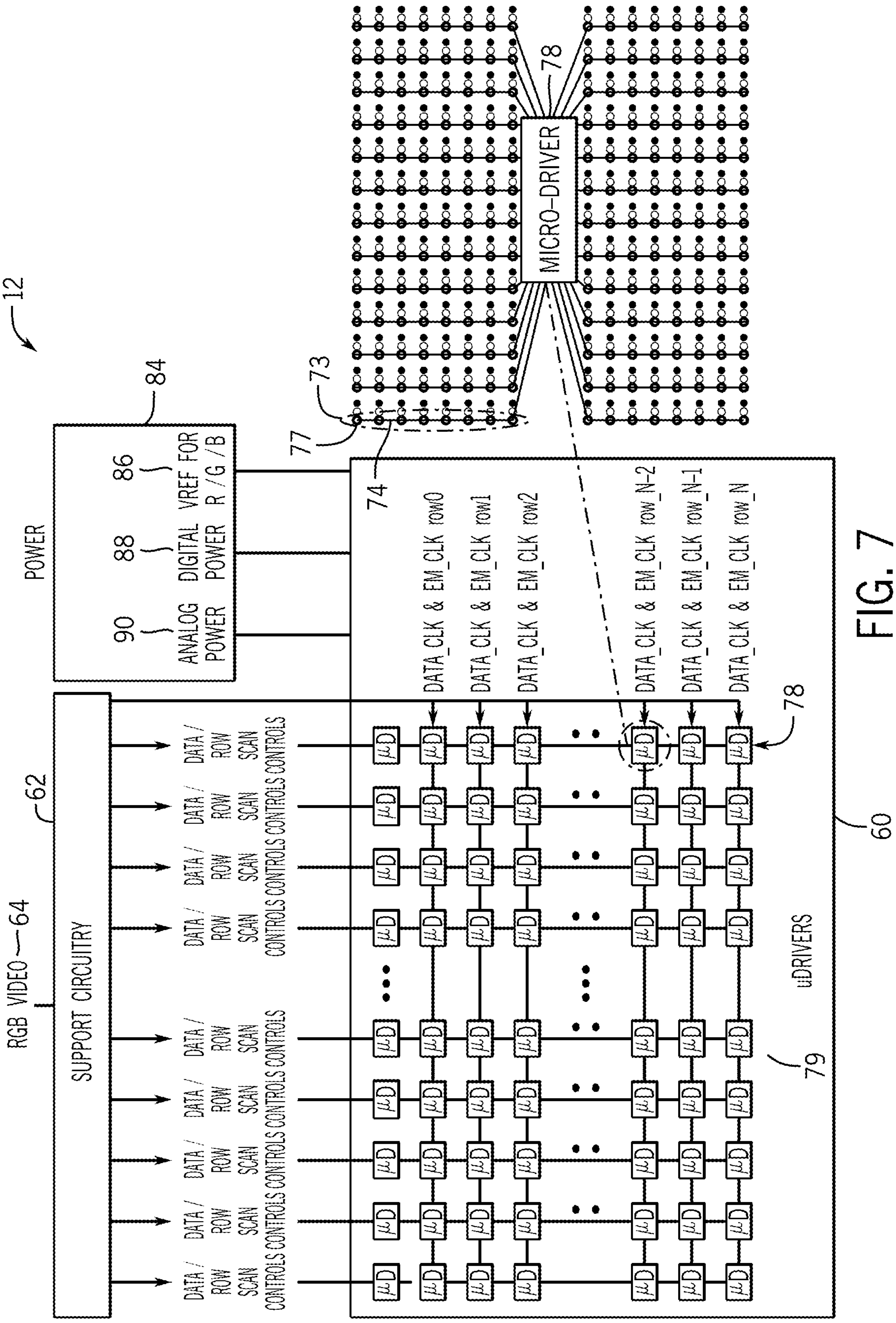
FIG. 7 is a block diagram of a micro-LED display that employs microdrivers to drive display pixels with controls signals, in accordance with an embodiment.

FIG. 7 depicts a block diagram of an example architecture of the electronic display 12 in the form of a micro-LED display. In the example of FIG. 7, the electronic display 12 uses an RGB display panel 60 with pixels that include red, green, and blue micro-LEDs as display pixels. Support circuitry 62 may receive RGB-format video image data 64. It should be appreciated, however, that the electronic display 12 may, additionally or alternatively, display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or a emission clock signal (EM_CLK) to control the provision of the image data 64 in the electronic display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

The display panel 60 may include microdrivers 78. The microdrivers 78 are arranged in an array 79. Each microdriver 78 drives a number of display pixels 77. Different display pixels (e.g., display sub-pixel) 77 may include different colored micro-LEDs (e.g., a red micro-LED, a green micro-LED, or a blue micro-LED) to represent the image data 64 in RGB format. Although one of the microdrivers 78 of FIG. 7 is shown to drive twenty-six anodes 73 having eight display pixels 77 each, each microdriver 78 may drive more or fewer anodes 73 and respective display pixels 77. As illustrated, the subset of display pixels 77 located on each anode 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 7. For example, cathode 74 corresponds to a red color channel (e.g., subset of red display pixels 77). Indeed, there may be a second set of cathodes that couple to a green color channel (e.g., subset of green display pixels 77) and a third set of cathodes that couple to a blue color channel (subset of blue display pixels 77), but these are not expressly illustrated in FIG. 7 for ease of description.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
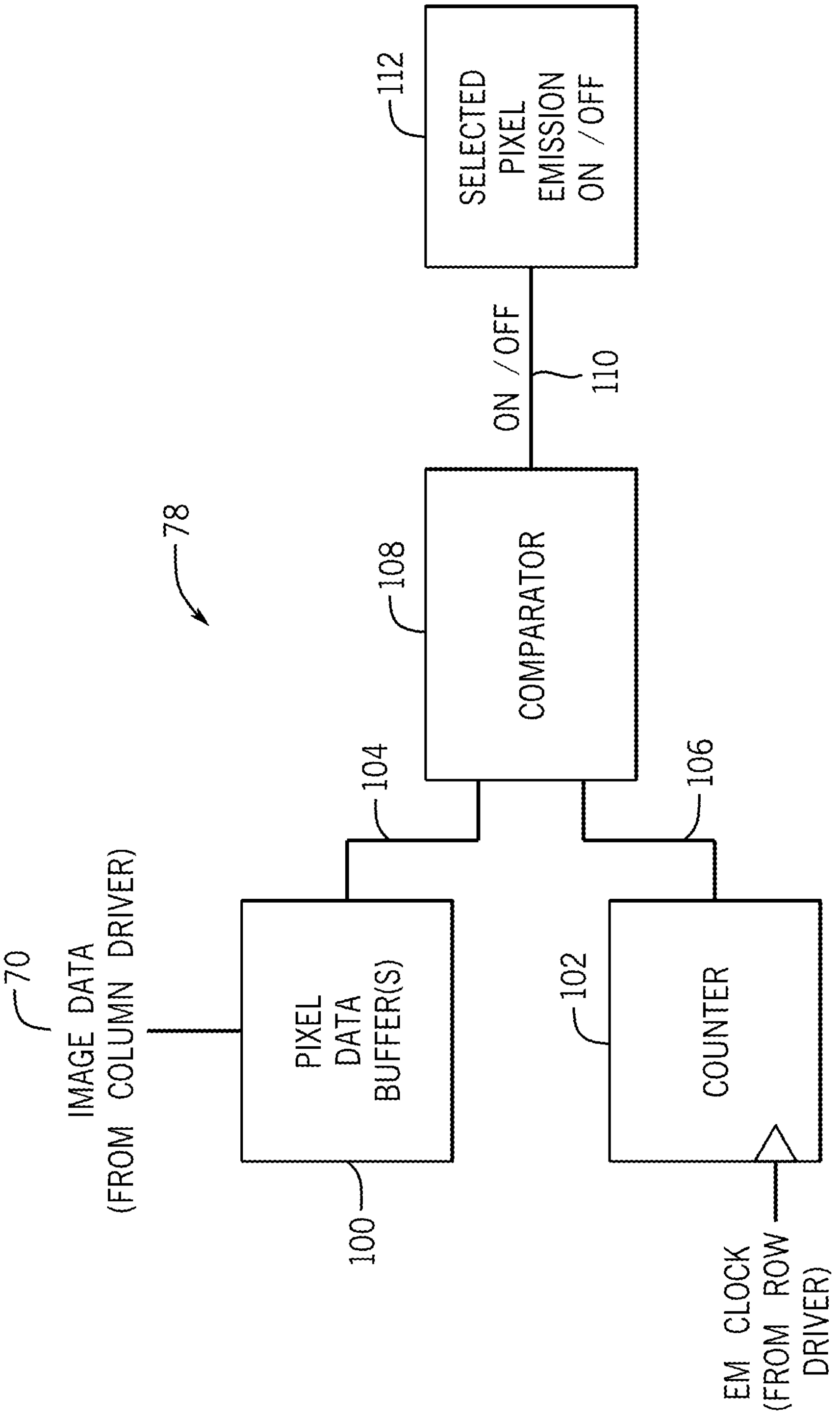
FIG. 8 is a block diagram schematically illustrating an operation of a microdriver of FIG. 7, in accordance with an embodiment.

A block diagram shown in FIG. 8 illustrates some of the components of one of the microdrivers 78. The microdriver 78 shown in FIG. 6 includes pixel data buffer(s) 100 and a digital counter 102. The pixel data buffer(s) 100 may include sufficient storage to hold the image data 70 that is provided. For instance, the microdriver 78 may include pixel data buffers to store image data 70 for a display pixel 77 at any one time (e.g., for 8-bit image data 70, this may be 24 bits of storage). It should be appreciated, however, that the microdriver 78 may include more or fewer buffers, depending on the data rate of the image data 70 and the number of display pixels 77 included in the image data 70. The pixel data buffer(s) 100 may take any suitable logical structure based on the order that the column driver provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the microdriver 78 may provide the emission clock signal (EM_CLK). A counter 102 may receive the emission clock signal (EM_CLK) as an input. The pixel data buffer(s) 100 may output enough of the stored image data 70 to output a digital data signal 104 represent a desired gray level for a particular display pixel 77 that is to be driven by the microdriver 78. The counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
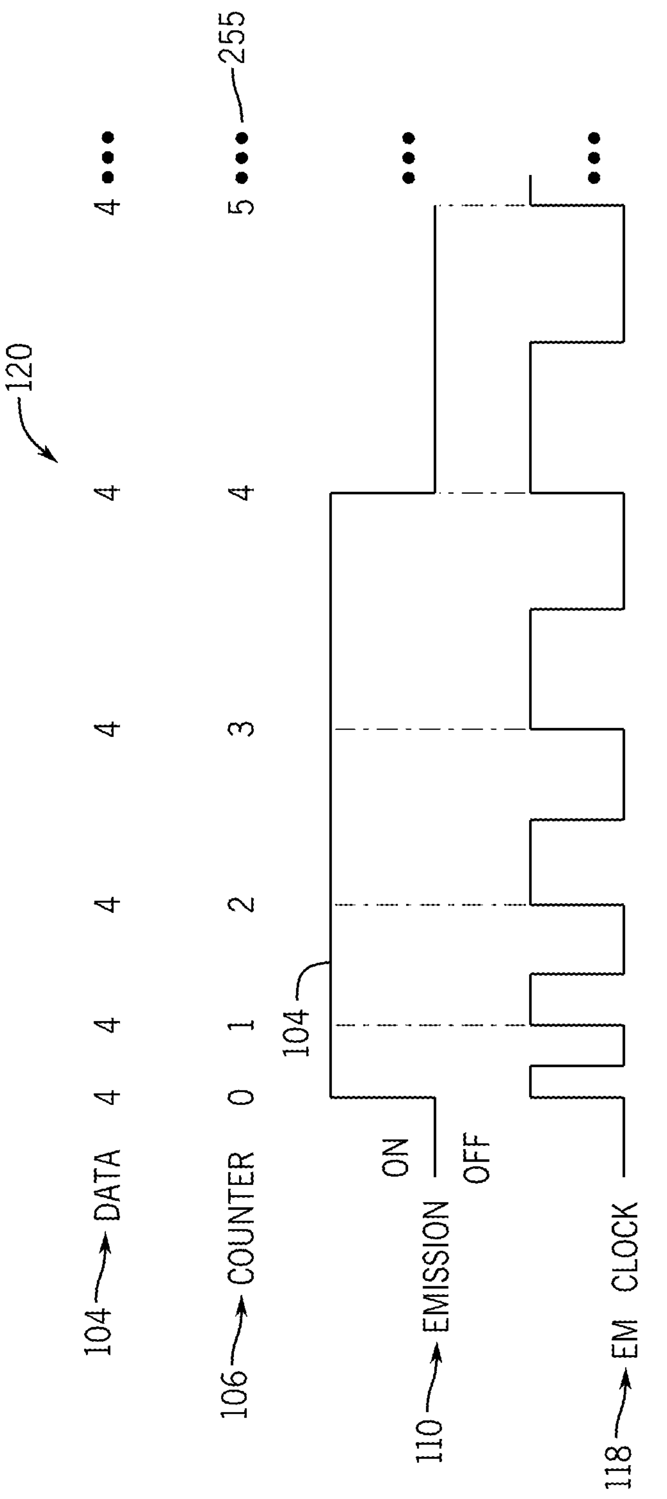
FIG. 9 is a timing diagram illustrating an example operation of the microdriver of FIG. 8, in accordance with an embodiment.

A timing diagram 120, shown in FIG. 9, provides one brief example of the operation of the microdriver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK) 118. Namely, as the emission clock signal (EM_CLK) 118 rises and falls, the digital counter signal 106 gradually increases. The comparator 108 outputs the emission control signal 110 to an "on" state as long as the digital counter signal 106 remains less than the data signal 104. When the digital counter signal 106 reaches the data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) 118 edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) 118 therefore may use relatively short time intervals between clock edges at first. To account for the increase in the difference between light emitted as gray levels increase, the differences between edges (e.g., periods) of the emission clock signal (EM_CLK) 118 may gradually lengthen. The particular pattern of the emission clock signal (EM_CLK) 118, as generated by the emission TCON, may have increasingly longer differences between edges (e.g., periods) so as to provide a gamma encoding of the gray level of the display pixel 77 being driven.

Figure 10:
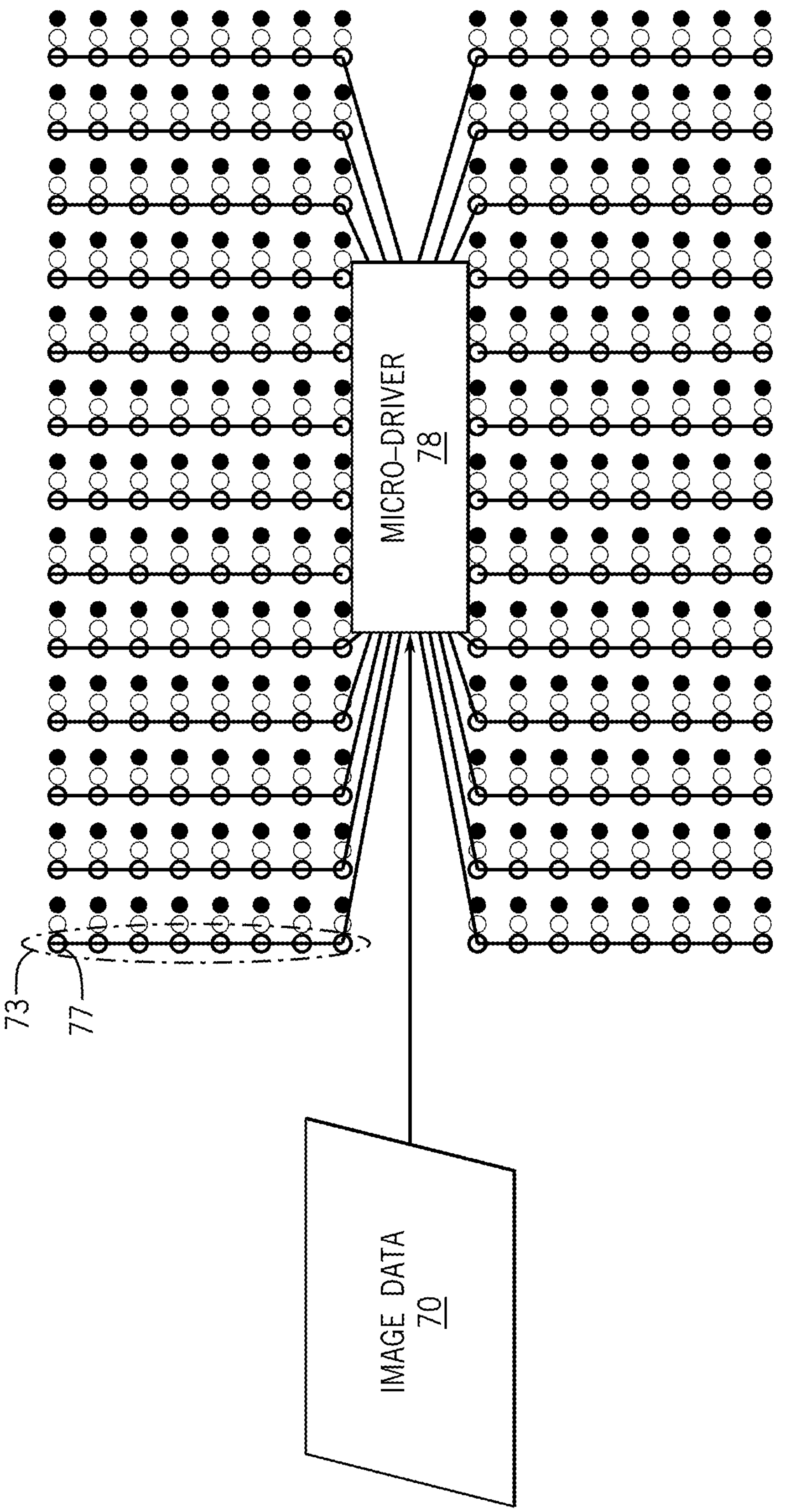
FIG. 10 is a schematic illustration of the micro-LED display of FIG. 7, where a microdriver controls a collection of display pixels based on a digital code, in accordance with an embodiment.

With the preceding in mind, FIG. 10 illustrates the microdriver 78 driving the display pixels 77 according to the image data 70, and thereby enabling image content to be displayed by the electronic display 12. As mentioned above, the microdriver 78 may drive any suitable number of display pixels 77, and a subset of display pixels 77 may be located on respective anodes 73 of the electronic display 12. As illustrated, the subset of display pixels 77 located on each anode 73 may be associated with a particular color (e.g., red, green, blue). Further, it should be noted that a respective cathode corresponds to a subset of display pixels 77 associated with a particular color even though each cathode for a particular color channel is not illustrated in FIG. 10. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 10 for ease of description.

Figure 11:
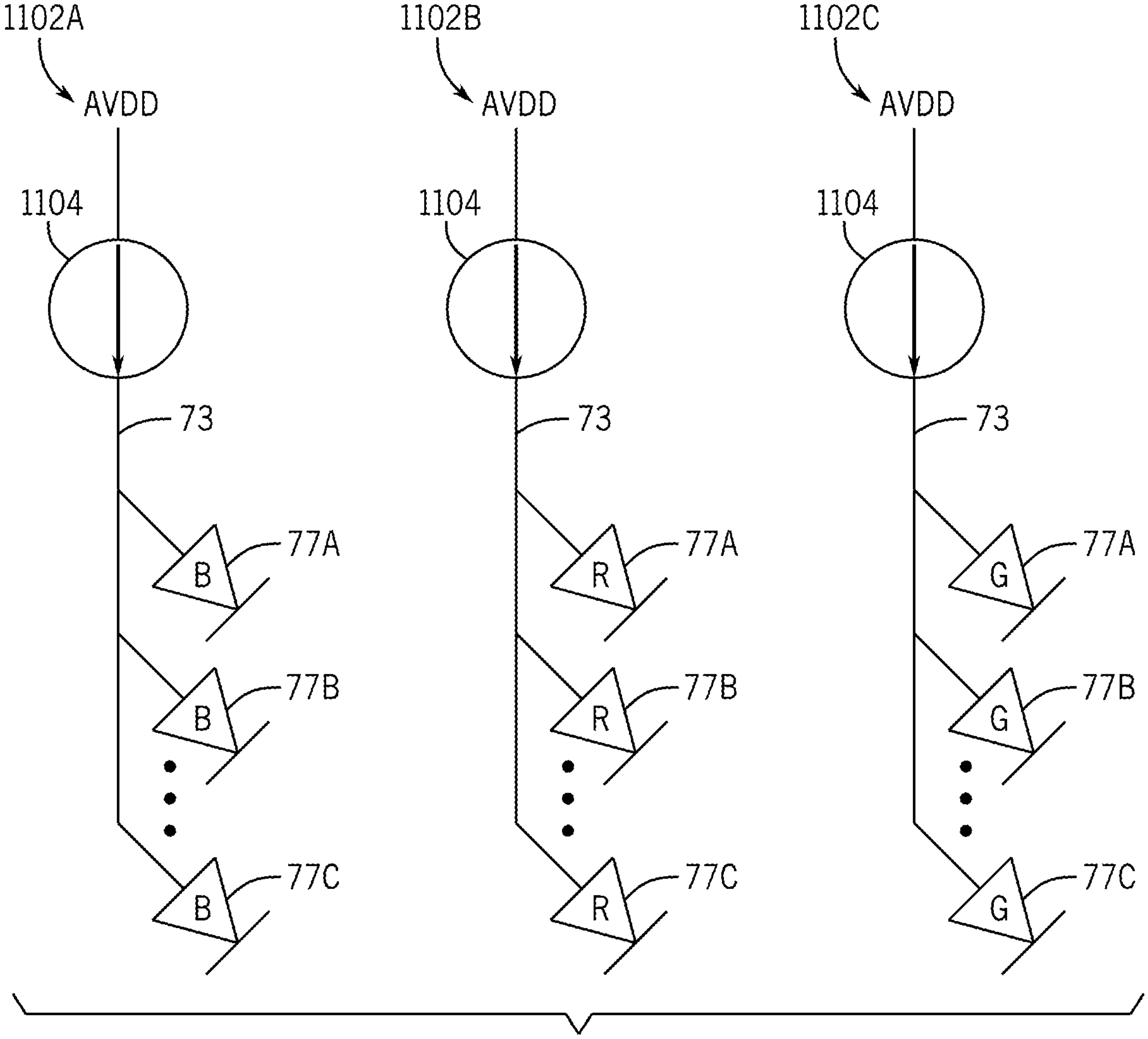
FIG. 11 is an example of driving circuitry for driving subpixels in a pixel, in accordance with an embodiment.

FIG. 11 is an example of driving circuitry 1102A, 1102B, and 1102C (collectively referred to herein as the driving circuitry 1102) for driving display pixels 77 (e.g., of the electronic display 12). A current source 1104 may drive current to each pixel in a row of pixels. For instance, the current sources 1104 may drive one or more pixels 77A, 77B, and 77C (collectively referred to herein as the pixels 77). The pixels 77 may include red, green, or blue pixels or subpixels.

Figure 12:
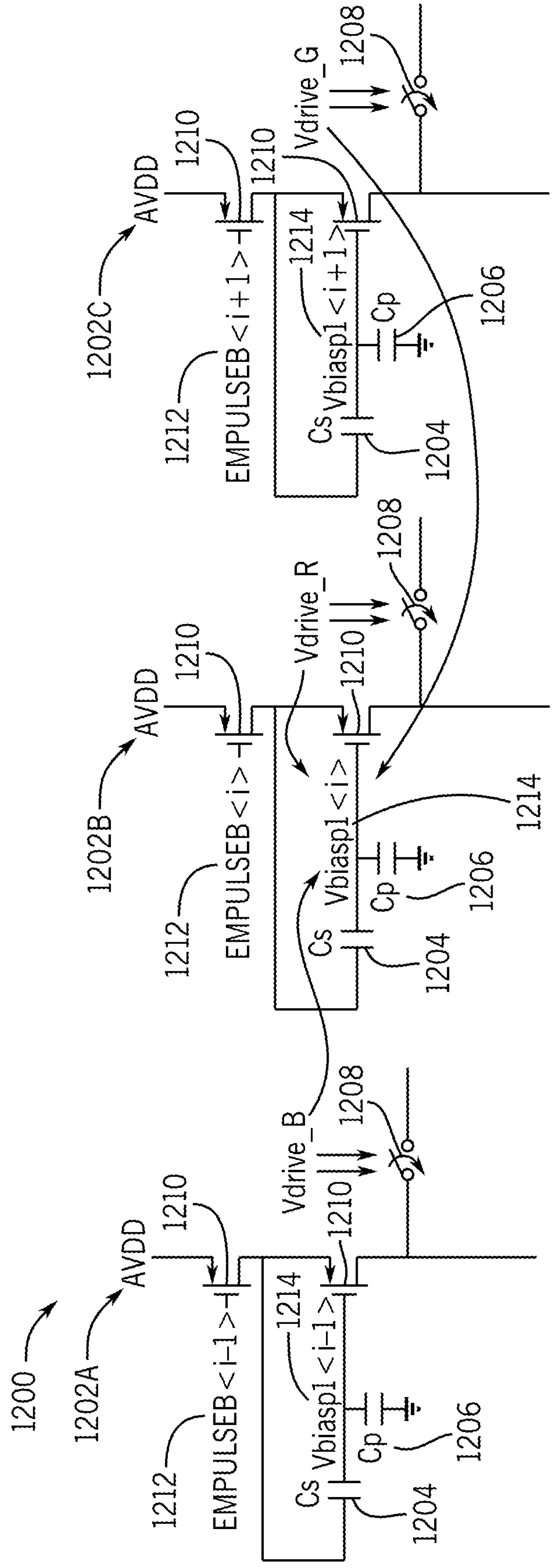
FIG. 12 is a schematic diagram of a system illustrating a detailed view of driving circuitry (e.g., the driving circuitry of FIG. 11) for driving subpixels in a row of pixels, in accordance with an embodiment.

FIG. 12 is a schematic diagram of a system 1200 illustrating a detailed view of driving circuitry (e.g., the driving circuitry 1102) for driving subpixels in a row of pixels 77. The system 1200 includes driving circuitry 1202A, driving circuitry 1202B, and driving circuitry 1202C (collectively referred to herein as the driving circuitry 1202), which may each be electrically coupled to the microdriver 78 and the display pixels 77 and may drive one display pixel 77 at a time. For example, the drive circuitry 1202A may drive blue pixels 77, the drive circuitry 1202B may drive red pixels 77, and the drive circuitry 1202C may drive green pixels 77. Each drive circuitry may include a series capacitor 1204, a parallel capacitor 1206, and a control switch 1208. The driving circuitries 1202 may include one or more switching devices 1210 (e.g., one or more n-channel metal oxide semiconductor (nMOS) field effect transistors or p-channel metal oxide semiconductor (pMOS) field effect transistors) for driving the control switches 1208. The switching devices 1210 may be controlled by an emission pulse signal 1212 or a bias voltage 1214 applied to a gate terminal of the switching devices 1210.

In some cases, as the control switches 1208 are opened and closed, capacitive coupling may form at the series capacitors 1204 and/or the parallel capacitors 1206, which may cause distortion in the microdriver 78 driving the pixels 77. This distortion may cause current droop across the pixels 77. Moreover, as previously stated, the current droop may increase in each subsequent pixel 77 in a row of pixels, which may cause each subsequent pixel 77 in a row of pixels to emit less light than the preceding pixel in the row of pixels. For example, the pixel 77A may experience distortion due to the capacitive coupling on the series capacitor 1204 and/or the parallel capacitor 1206, and if the distortion at the 77A is not addressed (e.g., an action is not taken at the pixel 77 to compensate for the current droop at the pixel 77), additional distortion may accrue at the subpixel 77B. Without compensating for the distortion and current droop, the distortion will continue to accumulate to the pixel 77C and the current droop caused by the distortion may be significant enough that the light emitted from the pixel 77C may be noticeably less than the light at the pixel 77A and the pixel 77B, which may result in display image artifacts (e.g., front-of-screen (FOS) artifacts).

The current droop at the pixels 77 may be reduced or eliminated by performing pixel compensation. Pixel compensation may refresh the charge on the series capacitors 1204 and/or the parallel capacitors 1206, thus removing the distortion from the series capacitors 1204 and/or the parallel capacitors 1206 caused by the capacitive coupling of the control switches 1208. In some embodiments, pixel compensation may be performed at each row of the pixels 77 in each subframe of an image frame, thus reducing or eliminating the distortion and reducing or eliminating the current droop across the pixels 77. However, performing pixel compensation on all rows in each subframe may consume a prohibitive amount of power. In other embodiments, pixel compensation may be performed on every $N^{th}$ row of pixels. For example, if pixel compensation is performed on every $8^{th}$ row of pixels, the accumulated current droop across the electronic display 12 may be reduced without consuming excessive power. However, performing pixel compensation in such a pattern may lead to image artifacts (e.g., banding), as will be discussed in greater detail below.

Figure 13:
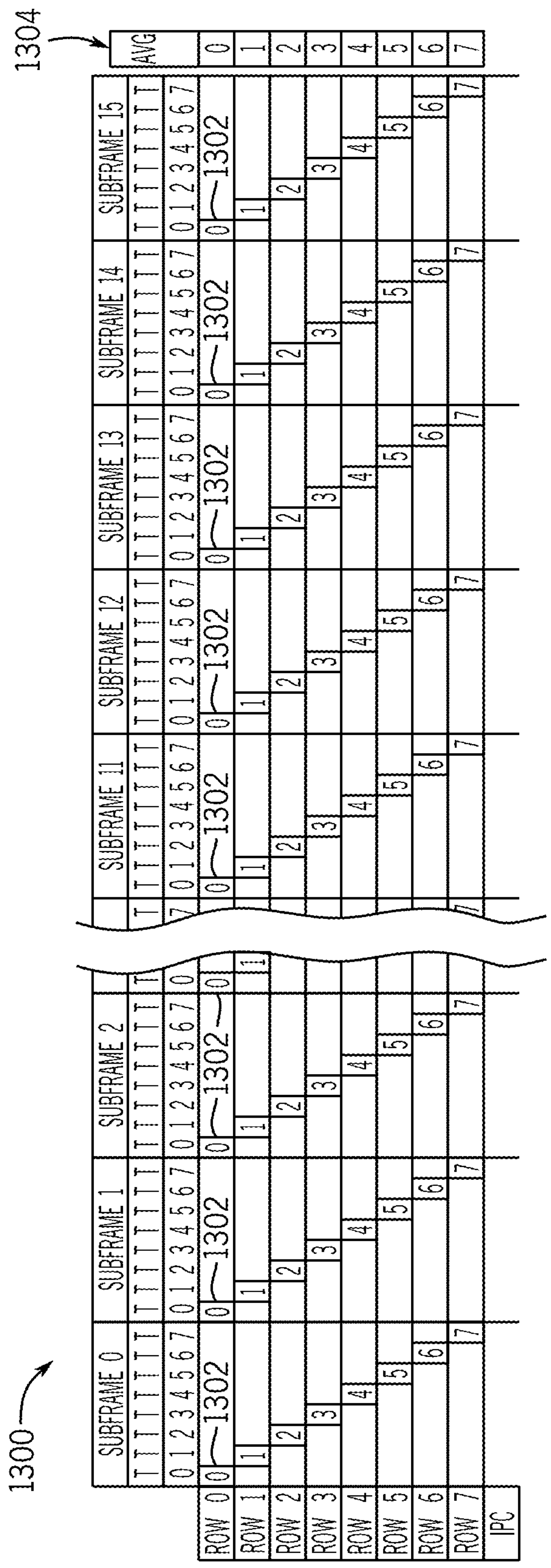
FIG. 13 is a table that may include an amount of current droop across a set of rows of the pixels that may accumulate at each row across a number of subframes, in accordance with an embodiment.

FIG. 13 is a table 1300 that may include an amount of current droop across a set of rows of the pixels 77 that may accumulate at each row across a number of subframes. The table 1300 illustrates luminance differences for emissions (e.g., emissions from the pixels 77 in each row within each subframe). The luminance differences may represent a difference between an expected luminance of a particular emission and the actual luminance of the particular emission. For example, using the pixel compensation pattern illustrated in table 1300, the luminance difference 1302 may be equal to 0 when no distortion has accumulated on the pixels 77 of a row (e.g., no distortion has accumulated on the capacitors 1204 or 1206), or the luminance difference 1302 may be equal to 0 for a row on which pixel compensation is performed. That is, when pixel compensation is performed on a row during a subframe, the actual emission luminance of the row may be equal to the expected emission luminance of the row during the subframe. The pixel compensation pattern in table 1300 may be stored in the local memory 20 or the storage device 22 of the electronic device 10.

As previously discussed, the current droop may accumulate for each row proportional to the length of time that a certain row emits a pulse and the compensated row (e.g., row 0 in the table 1300) emits a pulse. For example, in the table 1300 of FIG. 13, row 1 accumulates some distortion (e.g., due to the capacitive coupling of the driving circuitries 1202 as described above), but the distortion at row 1 is relatively little, as the microdriver 78 drives current to row 1 immediately after or a short interval of time after driving current to row 0. However, row 8 accumulates the greatest distortion, as the rows are driven in order and the microdriver 78 drives current to row 7 after all other rows, and thus the greatest amount of distortion accumulates at row 7 before pixel compensation is performed at row 0 of the subsequent subframe.

As such, the luminance difference increases for each subsequent row in a subframe of the table 1300 until pixel compensation is again performed on a given row. An average luminance difference 1304 may be determined based on the luminance difference for a given row across all subframes (e.g., 16 subframes, as shown in the table 1300).

Moreover, the total luminance difference across all rows for the entire frame may be calculated by multiplying an estimated current droop across the image frame by the difference between the maximum average luminance for the frame and the minimum average luminance for the frame divided by the number of rows emitting in the frame. That is, the total luminance difference for a particular row across the frame in the table 1300 can be represented by the equation $$\Delta L_{Total} = (i_{droop})\frac{L_{MAX} - L_{MIN}}{N}.$$

In the equation, $i_{droop}$ is the estimated output current droop across each subframe, $L_{MAX}$ is the maximum average luminance difference for the image frame, $L_{MIN}$ is the minimum average luminance difference for the image frame, and N is the number of rows in the image frame. For example, the estimated current droop across the image frame (independent of whether the frame is displaying at 480 Hertz (Hz), 960 Hz, or another appropriate frequency) may be equal to approximately 3.3% (e.g., for a nominal current of 0.3 microamps). As such, the total luminance difference for the pixel compensation pattern illustrated in table 1300 of FIG. 13 may be determined using the equation described above accordingly:

$$\Delta L_{Total} = (0.033)\frac{7 - 0}{8} = 2.888\%.$$

Figure 14:
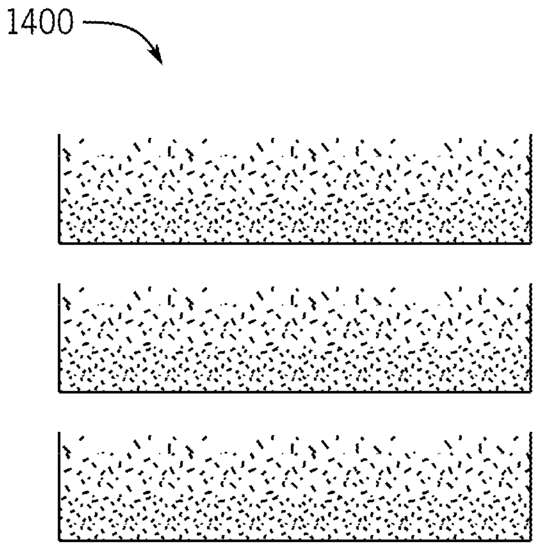
FIG. 14 is an example of an image artifact that may occur on the electronic display of the electronic device of FIG. 1 due to the pixel compensation described in FIG. 13, in accordance with an embodiment.

As stated above, while performing the pixel compensation may reduce or eliminate the current droop at a row, certain pixel compensation patterns may lead to an image artifact, as is illustrated in FIG. 14 as may be seen from the image artifact 1400 that may be displayed on the electronic display 12. Because pixel compensation is performed at every $1^{st}$ row (i.e., row 0) across the subframes displayed on the electronic display 12 (e.g., as is shown in the table 1300 of FIG. 13), certain image artifacts may be visible across the electronic display 12.

FIG. 14 is an illustration of an image artifact 1400 that may be caused by the pixel compensation pattern shown in the table 1300. As may be observed, since the pixel compensation is performed at the same row (i.e., row 0) across each subframe in FIG. 13, there is significantly less current droop across the upper rows (e.g., meaning the pixels in the upper rows exhibit less luminance difference and may emit brighter light) and significantly more current droop across the lower rows (e.g., meaning the pixels in the lower rows exhibit greater luminance difference and may emit dimmer light). As this pattern is repeated for the rows of the pixels 77 in the electronic display 12, the image artifact 1400 displayed on the electronic display 12 may exhibit a banding pattern that may negatively impact user experience. To address this, various pixel compensation patterns may be used to produce similar average luminance differences 1304 for all rows across the subframes of a frame.

FIG. 15 is a table 1500 that tracks another pixel compensation pattern and stores average luminance differences for each row of pixels 77 in each subframe of a frame. As illustrated, the table 1500 may include emissions at each row across 8 rows of pixels 77 for a frame that includes 16 subframes. While 8 rows are shown, it should be noted that the table 1500 may store data for any appropriate number of rows (e.g., 9 rows or more, 10 rows or more, 20 rows or more, 100 rows or more). Additionally, a frame may be divided up into any appropriate number of subframes (e.g., 2 subframes or more, 4 subframes or more, 10 subframes or more, 20 subframes or more, 50 subframes or more). Similarly to the table 1300 in FIG. 13, the luminance differences 1302 in the table 1500 may be 0 at a particular row on which pixel compensation is performed, and the luminance difference 1302 may increase with each subsequent row until the pixel compensation is again performed.

As may be observed, the pixel compensation pattern for the table 1500 may include performing pixel compensation whenever the row number is equal to the subframe number for subframes 1-8. For example, at subframe 6, the pixel compensation is performed at row 6. For subframes 9-16, the pixel compensation may be performed when the row counter is equal to the difference between 17 and the subframe number. For example, for subframe 10, the pixel compensation may be performed at row 7. The average luminance difference 1304 for each row across all 16 subframes (i.e., across one frame) may also be stored in the table 1500. As may be observed, due to the pixel compensation pattern illustrated in the table 1500, the average luminance difference 1304 for the rows in the table 1500 are much closer than the average luminance differences 1304 in the table 1300 in FIG. 13.

Due to the similarity in the average luminance difference for each row, the rows may output similar brightness levels, and the banding issue illustrated in FIG. 14 may be decreased or eliminated. Given the values in the table 1500, the total luminance difference across all 8 rows for the entire frame may be determined using the equation described above as follows:

$$\Delta L_{Total} = (0.033)\frac{3.5625 - 3.5}{8} = 0.026\%.$$

As such, the pixel compensation pattern in FIG. 15 nearly averages out the current droop and subsequent luminance difference across the image frame.

FIG. 16 is a table 1600 using the same pixel compensation pattern illustrated in the table 1500 in FIG. 15, however the table 1600 takes into account additional current droop due to intra-frame pause (IFP) 1602. Intra-frame pause 1602 may cause additional distortion in the microdriver 78 during touchscreen operation of the electronic display 12 (e.g., when a user of the electronic device 10 interacts with the touchscreen-enabled electronic display 12). As may be observed in the table 1600, IFP 1602 may cause an additional luminance difference (e.g., an additional luminance difference of 0.7%), resulting in an additional luminance difference every two subframes.

As may be observed from the average luminance difference 1304, IFP 1602 may increase the average luminance difference 1304 for each row across the frame, and thus may increase the total average luminance difference across the entire image frame. Using the formula for total luminance difference across all rows for the image frame as discussed above, the total luminance difference for the image frame illustrated by the table 1600 may be calculated accordingly:

$$\Delta L_{Total} = (0.033)\frac{4.30625 - 3.5}{8} = 0.033\%.$$

As such, it may be appreciated that, while the IFP 1602 may cause additional luminance difference across the image frame, the applied pixel compensation pattern may still effectuate a greater reduction in luminance difference than other pixel compensation patterns (e.g., the pixel compensation pattern discussed in FIG. 13). It should be noted that, while the IFP 1602 is shown in FIG. 16 to occur between every two subframes, IFP may occur between at any appropriate interval (e.g., every subframe, every three subframes, every four subframes, every eight subframes, every ten subframes, and so on).

In certain embodiments, a shuffling pattern may be applied to the emission timing for the pixels 77 of the electronic display 12. The pixel compensation patterns discussed previously may not average out the luminance difference across the electronic display 12 when applied to an electronic display 12 having a shuffled emission pattern (e.g., such that the pixel compensation may not prevent an image artifact from occurring on the electronic display 12). As such, using a shuffled emission pattern may cause greater luminance difference across the image frame even when pixel compensation patterns (e.g., the pixel compensation patterns illustrated in FIGS. 15 and 16) are applied. As such, in certain embodiments, another pixel compensation pattern may be applied that accounts for the shuffled emission pattern.

FIG. 17 includes an example of shuffled emission pattern 1700 that may be applied across a frame, and a table 1710 illustrating an application of a shuffled emission pattern and a shuffled pixel compensation pattern. The values shown in the shuffled emission pattern represent the order in which the rows (e.g., the pixels 77 in the rows) emit pulses of light. As may be observed, when a shuffled emission pattern is applied to the pixels 77 in the rows, the rows of the pixels 77 may not emit in a sequential manner (i.e., row 1 may not emit first, row 2 may not emit following row 1, row 3 may not emit following row 2, and so on). The circled values represent two pixels compensation patterns 1702 and 1704 that may account for the shuffled emission pattern. The pixel compensation pattern 1702 may be performed on the first four subframes of a frame (e.g., as may be observed from subframes 1 through 4 of the table 1710) while the pixel compensation pattern 1704 may be performed on the next four subframes of a frame (e.g., as may be observed from subframes 5 through 8 of the table 1710). As may be observed from the table 1710, the pixel compensation patterns 1702 and 1704 may repeat in reverse order for the remaining eight subframes of the frame. In some embodiments, the emission shuffling patterns (e.g., 1700) may be random, while in other embodiments the pattern may be deterministic.

The shuffled emission pattern 1700 may increase the luminance difference across the rows of the electronic display 12. By applying the equation described above, luminance difference for the shuffled emission pattern 1700, even accounting for the pixel compensation patterns 1702 and 1704 may be represented accordingly:

$$\Delta L_{Total} = (0.033)\frac{5.09375 - 2.66875}{8} = 1.000\%.$$

As such, it may be desirable to apply one or more pixel compensation patterns that may account for shuffled emission pattern schemes.

FIG. 18 illustrates multiple pixel compensation patterns that may be effective in reducing or eliminating luminance differences caused by current droop in an electronic display (e.g., 12) utilizing a sequential emission pattern. FIG. 18 includes a table 1802 including sequential emission pattern 1808 and a pixel compensation pattern whereby pixel compensation is performed on every $7^{th}$ row across 16 subframes, a table 1804 including the sequential emission pattern 1808 and a pixel compensation pattern whereby pixel compensation is performed on every $5^{th}$ row across 16 subframes, and a table 1806 including the sequential emission pattern 1808 and a pixel compensation pattern whereby pixel compensation is performed on every $3^{rd}$ row across 16 subframes.

By performing pixel compensation on every $7^{th}$ row, every $5^{th}$ row, or every $3^{rd}$ row, the total luminance difference across the frame may be reduced or eliminated. Applying the total luminance difference equation to the table 1802, the total luminance difference across the frame may be determined as follows:

$$\Delta L_{Total} = (0.033)\frac{3.381 - 2.688}{8} = 0.302\%.$$

Applying the equation to the table 1804, the total luminance difference across the frame may be determined as follows:

$$\Delta L_{Total} = (0.033)\frac{2.513 - 1.875}{8} = 0.263\%.$$

Applying the equation to the table 1806, the total luminance difference across the frame may be determined as follows:

$$\Delta L_{Total} = (0.033)\frac{1.469 - 0.938}{8} = 0.219\%.$$

As such, by performing pixel compensation on every $7^{th}$ row, $5^{th}$ row, or $3^{rd}$ row, the total luminance difference across an image frame may be kept at or below approximately 0.3% while consuming less power than would be consumed if pixel compensation were to be performed on each row across each subframe.

FIG. 19 illustrates how the pixel compensation patterns described in FIG. 18 may be effective in reducing or eliminating luminance differences caused by current droop in an electronic display (e.g., 12) utilizing a shuffled emission pattern. FIG. 19 includes a table 1902 including shuffled emission pattern 1908 and a pixel compensation pattern whereby pixel compensation is performed on every $7^{th}$ row across 16 subframes, a table 1904 including the shuffled emission pattern 1908 and a pixel compensation pattern whereby pixel compensation is performed on every $5^{th}$ row across 16 subframes, and a table 1906 including the shuffled emission pattern 1908 and a pixel compensation pattern whereby pixel compensation is performed on every $3^{rd}$ row across 16 subframes.

By performing pixel compensation on every $7^{1}$ row, every $5^{th}$ row, or every $3^{rd}$ row, the total luminance difference across the frame may be reduced or eliminated. Applying the equation described above to the table 1902, the total luminance difference across the frame may be determined as follows:

$$\Delta L_{Total} = (0.033)\frac{3.669 - 2.319}{8} = 0.706\%.$$

Applying the equation to the table 1804, the total luminance difference across the frame may be determined as follows:

$$\Delta L_{Total} = (0.033)\frac{2.656 - 1.688}{8} = 0.400\%.$$

Applying the equation to the table 1806, the total luminance difference across the frame may be determined as follows:

$$\Delta L_{Total} = (0.033)\frac{1.506 - 0.875}{8} = 0.260\%.$$

As such, by performing pixel compensation on every $7^{th}$ row, $5^{th}$ row, or $3^{rd}$ row, the total luminance difference across an image frame may be kept at or below approximately 0.75% while consuming less power than would be consumed if pixel compensation were to be performed on each row across each subframe.

FIG. 20 illustrates how the pixel compensation patterns described in FIG. 18 may be effective in reducing or eliminating luminance differences caused by current droop in an electronic display (e.g., 12) utilizing another shuffled emission pattern. FIG. 20 includes a table 2002 including shuffled emission pattern 2008 and a pixel compensation pattern whereby pixel compensation is performed on every $7^{th}$ row across 16 subframes, a table 2004 including the shuffled emission pattern 2008 and a pixel compensation pattern whereby pixel compensation is performed on every $5^{th}$ row across 16 subframes, and a table 2006 including the shuffled emission pattern 2008 and a pixel compensation pattern whereby pixel compensation is performed on every $3^{rd}$ row across 16 subframes.

By performing pixel compensation on every $7^{th}$ row, every $5^{th}$ row, or every $3^{rd}$ row, the total luminance difference across the frame may be reduced or eliminated. Applying the equation to the table 1902, the total luminance difference across the frame may be determined as follows:

$$\Delta L_{Total} = (0.033)\frac{3.781 - 2.525}{8} = 0.518\%.$$

Applying the equation to the table 1804, the total luminance difference across the frame may be determined as follows:

$$\Delta L_{Total} = (0.033)\frac{2.550 - 1.731}{8} = 0.338\%.$$

Applying the equation to the table 1806, the total luminance difference across the frame may be determined as follows:

$$\Delta L_{Total} = (0.033)\frac{1.256 - 0.981}{8} = 0.113\%.$$

As such, by performing pixel compensation on every $7^{th}$ row, $5^{th}$ row, or $3^{rd}$ row, the total luminance difference across an image frame may be kept at or below approximately 0.50% while consuming less power than would be consumed if pixel compensation were to be performed on each row across each subframe.

As may be appreciated, by applying pixel compensation to each $7^{th}$ row, $5^{th}$ row, or $3^{rd}$ row, total luminance difference across the frame (and thus FOS artifacts on the electronic display 12) may be reduced without consuming excessive power and may reduce luminance difference across the frame when accounting for additional luminance difference due to IFP 1602 and/or various emission patterns. While performing pixel compensation on every $7^{th}$, $5^{th}$ and $3^{rd}$ row in the frame is shown and discussed in FIGS. 18, 19, and 20 above, it should be noted that many pixel compensation methods may be used. However, to increase the effectiveness of the pixel compensation, the interval and the number of rows may be mutually prime. For example, for 8 rows of pixels (as discussed above), performing pixel compensation on every row, every $3^{rd}$ row, every $5^{th}$ row, and every $7^{th}$ row may provide effective reduction of luminance differences and thus potentially an effective reduction in image artifacts. However, performing pixel compensation on every $2^{nd}$ row, every $4^{th}$ row, every $6^{th}$, row, or every $8^{th}$ row may be less effective in reducing the luminance differences, as the common divisors may result in the same rows receiving pixel compensation repeatedly, and thus may result in some rows emitting consistently brighter light (due to the reduced current droop on those rows) and other rows emitting consistently dimmer light (due to the unmitigated current droop on those rows) across the image frame.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A tangible, non-transitory, computer-readable medium, comprising instructions configured to, when executed, cause one or more processors to:

drive, via driving circuitry, pixels from a row for a set of N number of rows of pixels of an electronic display, wherein the driving circuitry outputs a current to the row of pixels, wherein a first pixel of the row of pixels receives a first amount of current and a last pixel of the row of pixels receives a second amount of current; and perform, on every Mth row of the N number of rows, a compensation to the driving circuitry to cause the driving circuitry to provide a third amount of current to the last pixel of the row of pixels, wherein M and N are mutually prime numbers.

2. The tangible, non-transitory, computer-readable medium of claim 1, wherein the first amount of current is greater than the second amount of current.

3. The tangible, non-transitory, computer-readable medium of claim 1, wherein the third amount of current is greater than the second amount of current.

4. The tangible, non-transitory, computer-readable medium of claim 1, wherein the compensation is performed at every 3rd row of the set of rows of pixels.

5. The tangible, non-transitory, computer-readable medium of claim 1, wherein the compensation is performed at every 5th row of the set of rows of pixels.

6. The tangible, non-transitory, computer-readable medium of claim 1, wherein the compensation is performed at every 7th row of the set of rows of pixels.

7. A system comprising:

driving circuitry comprising at least one storage capacitor;

a plurality of pixels configured to receive current from the driving circuitry and configured to emit pulses of light according to a randomized emission pattern;

one or more processors configured to execute instructions, wherein, when the instructions are executed, are configured to cause the one or more processors to:

cause the driving circuitry to drive current to the plurality of pixels, wherein the driving circuitry initially outputs a first current and gradually outputs a second current; and perform a compensation to the driving circuitry to cause the driving circuitry to output a third current.

8. The system of claim 7, wherein the plurality of pixels comprises N number of rows of pixels, and the compensation is performed at every Mth row, wherein N and M are mutually prime numbers.

9. The system of claim 7, wherein performing the compensation comprises refreshing a charge stored on the at least one storage capacitor.

10. A method comprising:

periodically driving pixels from one row at a time for N rows of pixels using driving circuitry of an electronic display, wherein the driving circuitry starts outputting a first current but gradually outputs a lower current over time; and performing a compensation to the driving circuitry to cause the driving circuitry to return to outputting the first current when the driving circuitry has driven pixels from a first number of rows, wherein the first number of rows is a prime number that is not a prime number that the number N is composed of.

11. The method of claim 10, wherein the period repeats at each subframe of a frame displayed on the electronic display.

12. The method of claim 11, wherein the frame comprises 16 subframes.

13. The method of claim 12, wherein the number N is 8 and the compensation is performed on a subsequent sequential row for a first 8 subframes of the 16 subframes and wherein the compensation is performed on a previous sequential row for a second 8 subframes of the 16 subframes.

14. The method of claim 10, wherein the number N is 8 and the compensation is performed when the driving circuitry has driven pixels from 3 rows.

15. The method of claim 10, wherein the number N is 8 and the compensation is performed when the driving circuitry has driven pixels from 5 rows.

16. The method of claim 10, wherein the number N is 8 and the compensation is performed when the driving circuitry has driven pixels from 7 rows.

17. The method of claim 10, wherein a frame pause occurs every M number of subframes of a frame displayed on the electronic display.

18. The method of claim 17, wherein the number M is 2.

19. The method of claim 17, wherein the number M is 4.

20. The tangible, non-transitory, computer-readable medium of claim 1, wherein N is 8.

* * * * *